United States Patent [19]
Miller

[11] 3,867,084
[45] Feb. 18, 1975

[54] ADJUSTABLE MOLD
[75] Inventor: Frederick O. Miller, Saginaw, Mich.
[73] Assignee: Miller Mold Company, Saginaw, Mich.
[22] Filed: July 30, 1973
[21] Appl. No.: 383,979

[52] U.S. Cl. .............................................. 425/383
[51] Int. Cl. .............................................. B29d 7/22
[58] Field of Search ........ 425/387 R, 383, 385, 390, 425/392, 393, 394, 395, 396, 397, 398, 440, 441; 249/118, 158

[56] References Cited
UNITED STATES PATENTS

| | | | |
|---|---|---|---|
| 643,422 | 2/1900 | McFarland | 425/396 |
| 2,783,500 | 3/1957 | Lazarr | 425/387 |
| 3,358,061 | 12/1967 | Gidge | 425/404 X |
| 3,428,289 | 2/1969 | Heckrotte | 425/441 X |
| 3,484,900 | 12/1969 | Sands | 425/393 |
| 3,566,447 | 3/1971 | Ogden | 425/440 X |
| 3,594,254 | 7/1971 | Lemelson | 425/387 X |
| 3,669,606 | 6/1972 | Brown | 425/398 |
| 3,768,950 | 10/1973 | Ihde | 425/398 |

Primary Examiner—Francis S. Husar
Assistant Examiner—John S. Brown
Attorney, Agent, or Firm—Learman & McCulloch

[57] ABSTRACT

A mold member has a cavity defined by a wall having a groove therein opening into the cavity and within which is accommodated a flexible bar having a smooth edge confronting the cavity. The opposite edge of the bar is slotted at intervals along its length so as to render the bar flexible in its own plane. Rotary adjusting cams are accommodated in openings formed in the bar between adjacent slots for effecting adjustments of selected portions of the bar into and out of the cavity, thereby to enable the effective wall thickness of a molded product to be varied.

13 Claims, 7 Drawing Figures

PATENTED FEB 18 1975　　　　　　　　　　　　3,867,084

ADJUSTABLE MOLD

The invention relates to a mold construction of the kind adapted to mold a large article, such as a refrigerator body or door liner, from a plastic sheet and wherein the mold is equipped with adjustable means for compensating for differences in wall thickness at the marginal edge of the molded article.

In the manufacture of a refrigerator body or door, the body or door of the refrigerator comprises an outer shell of metal and a molded inner liner of plastic material which conforms generally to the configuration of the outer shell, but is spaced therefrom so as to enable thermal insulating material to be interposed between the liner and the shell. At the open side of the body or door shell the marginal edge of the liner conventionally is fitted into a metallic or other retainer strip carried by the shell for the purpose of providing a seal between the marginal edge of the liner and the corresponding edge of the shell to prevent the loss of insulating material and to provide a thermal barrier.

A refrigerator liner of the kind referred to usually is formed from a single sheet of thermoformable plastic by either a vacuum or pressure molding process in which the sheet is deformed into the cavity of a mold and subsequently trimmed to conform to the dimensions of the shell. In such a molding process it virtually is impossible to maintain uniform wall thickness of the marginal edge of the liner as a consequence of which the desired seal between the liner and its retainer cannot be obtained at those portions of the liner having a wall thickness less than that of other zones of the marginal wall. In some cases the variations in wall thickness of a liner amount to several thousandths inch which results in serious thermal inefficiency and, in some cases, loss of insulating material when the latter is introduced between the shell and the liner.

An object of this invention is to provide an adjustable mold construction which enables variations in wall thickness of a molded plastic article to be compensated for during the molding of the article so as to overcome the disadvantages referred to above.

Another object of the invention is to provide a mold having a flexible member which may be adjusted into and out of a mold cavity so as to produce deformations in selected portions of a molded article in such manner as to provide an effectively uniform, marginal edge wall thickness for the article.

Other objects and advantages of the invention will be pointed out specifically or will become apparent from the following description when it is considered in conjunction with the appended claims and the accompanying drawings, in which:

Figure 1:
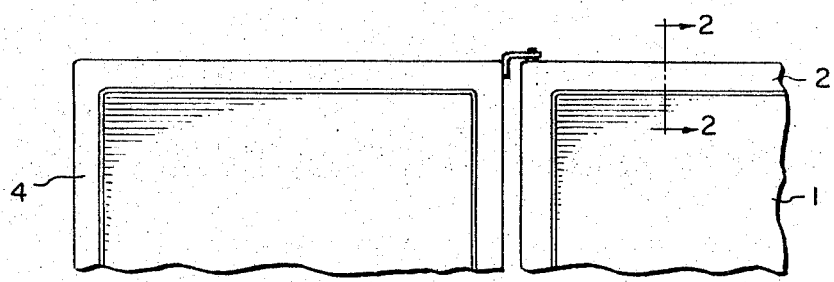
FIG. 1 is a fragmentary, front elevational view of a refrigerator equipped with a liner constructed according to the invention, the door of the refrigerator being open.
Figure 3:
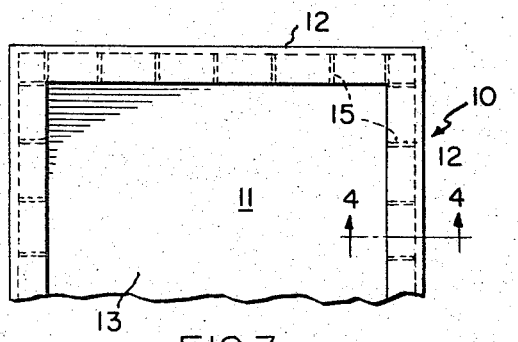
FIG. 3 is a fragmentary, plan view of a mold constructed in accordance with the invention.
Figure 2:
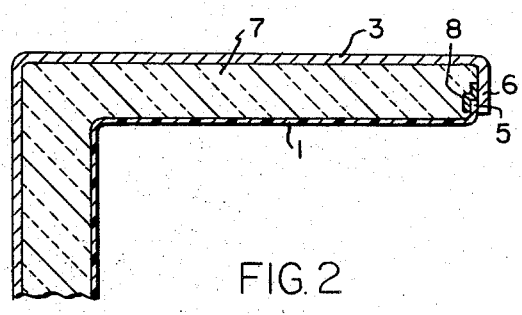
FIG. 2 is an enlarged, sectional view taken on the line 2—2 of FIG. 1.
Figure 4:
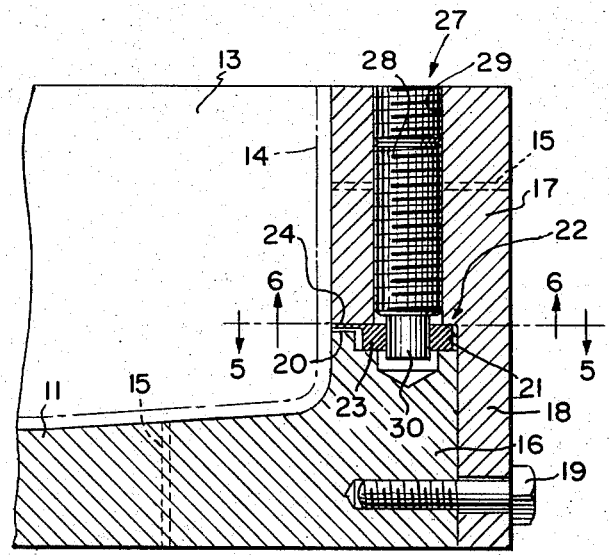
FIG. 4 is an enlarged sectional view taken on the line 4—4 of FIG. 3.
Figure 5:
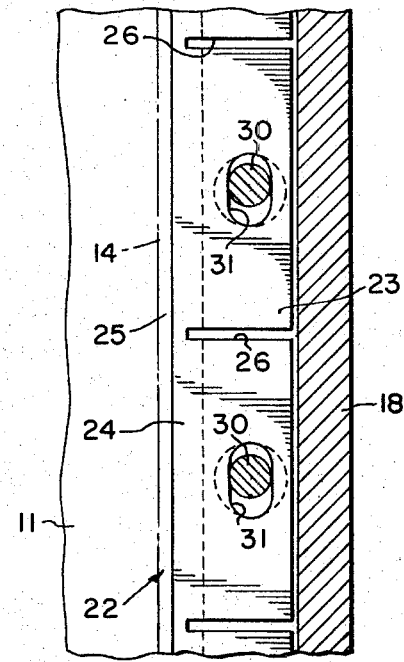
FIG. 5 is a sectional view taken on the line 5—5 of FIG. 4.

A mold constructed according to the invention is adapted for use in molding many different products, one of which may be the inner liner 1 of a refrigerator door 2 of the kind having a metal shell 3 forming the main body of the door which is hinged to a refrigerator body 4, as is conventional. The liner 1 preferably is formed as an integral member of such size as to fit within the body shell 3 and having flanges or side walls 5 which terminate adjacent the marginal edges 6 of the body 2. The walls of the liner are spaced from the corresponding walls of the shell 3 so as to permit thermal insulation material 7 to be interposed therebetween, as is conventional.

The marginal edges of the liner 1 conventionally are fitted into metallic or other rigid retaining strips 8 which are welded or otherwise fixed to the shell 3 in a position extending completely around the open side of the door 2. The retaining strips 8 conventionally are rolled or otherwise formed independently of the liner 1 so that the marginal edges 5 of the latter must be fitted into the strips 8 during assembly of the parts of the refrigerator. The retaining strips can be manufactured to reasonably close tolerances, but such is not always the case in the molding of the liner. Thus, it is not uncommon for the thickness of the marginal wall of a given liner to vary by several thousandths inch around the perimeter of the liner. Such variations may be in the form of a gradually increasing or decreasing wall thickness from one end of a wall toward the other, or there may be alternating zones of lesser and greater wall thickness.

The liners produced by an individual mold will be substantially uniform, but the liners produced by another, ostensibly identical mold may be different from those produced by the first mold. There are several reasons for such discrepancies having little or nothing to do with the quality of the mold itself. For example, one mold may be positioned in an area where it is subjected to temperatures different from those to which another mold is subjected or there may be differences in the temperature at which different plastic sheets are heated prior to the molding process. Temperature variations of these kinds will affect the wall thicknesses of the molded products.

The seal obtained between the marginal edge of a liner 1 and its retaining strips 8 depends, in large measure, upon the snugness with which the liner fits within the retainer. If some portion of the marginal wall of the liner is considerably thicker than another portion, there inevitably will be leakage past the thinner wall portion. In some cases, the differences in wall thickness of a liner are so great that insulation blown into the space between the liner and the shell escapes therefrom. Corrective adjustments are difficult to make following assembly of the liner with the other parts of the refrigerator because it is difficult to know for certain just where the thin walled liner portions are located and because the retainers 8 are fairly rigid. In addition, adjustment of a retaining strip is not always desirable inasmuch as variations in its thickness may be noticeable and, in addition, may cause chipping or cracking of paint which may be applied thereto.

A mold constructed in accordance with the invention makes it possible to compensate for the differences in wall thicknesses of the marginal edge of a liner, and prior to the molding of the liner.

A mold constructed in accordance with the invention comprises a mold member 10 having a base 11 and upstanding side walls 12 forming a cavity 13 into which a deformable sheet 14 of plastic material, such as polyvinylchloride, polypropylene, or the like, may be deformed by either a vacuum or pressure molding process. A number of passages 15 may be provided in the mold walls and base through which air or other gas may pass, as is conventional.

The side walls of the mold are formed in two parts. Each side wall includes a first, relatively short portion 16 which projects above the level of the base 11 and an extension 17 which extends in prolongation of the portion 16. The extension 17 includes a flange 18 which lies adjacent the wall portion 16 and is secured thereto by a plurality of bolts 19.

When the extension 17 is assembled with its adjacent wall portion 16, a groove 20 is provided which opens into the cavity 11. The groove 20 communicates with an enlarged, elongate chamber 21 which extends the length of the wall portion 16 and in which is accommodated an adjustable bar 22. The bar has a body portion 23 from which extends a tongue or flange 24 having a smooth edge 25 and which occupies the groove 20. At uniform intervals along its length the body portion 23 of the bar 22 is transversely slotted as at 26, the slots extending into the flange 24, but terminating short of the smooth edge 25. The depth of the slots 26, coupled with the relatively thin flange 24 and the thinness of the joint between adjacent slotted portions of the bar, enables the bar to be flexible in its own plane. The slots 26 preferably are of uniform width and depth.

Means designated generally by the reference character 27 is provided for adjusting the bar 22 and comprises a plurality of threaded actuating bolts 28 received in spaced apart, correspondingly threaded bores 29 formed in the extension 17. Each of the bolts 28 terminates at its inner end in an eccentric or cylindrical cam 30 which is received in an elongate opening 31 formed in the bar 22 midway between adjacent slots. The height of each opening 31 corresponds substantially to the diameter of the cam 30, but the length of each slot is greater than the cam diameter, as a consequence of which rotation of a cam 30 will effect vertical movement of the associated portion of the bar, but will not effect lengthwise movement of the bar. The opposite or outer end of each bolt 28 may be formed with a socket for the accommodation of a wrench to facilitate rotation of the associated cam.

The thickness of the flange 24 corresponds substantially to the width of the groove 20 so that the flange occupies substantially the full width of the groove with only sufficient clearance to permit relative movement between the flange and the associated side wall of the mold.

To condition the mold for use in molding a product such as a refrigerator door liner, the cams 30 will be rotated to such positions that the smooth edge 25 of the flange is flush with the inner surface of the mold wall. A model liner then is molded and trimmed, just as if it were to be a finished product. The marginal wall thickness about the entire perimeter of the molded model then may be measured for the purpose of noting the extent and locations of variations in the wall thickness. Those portions of the bar 22 at the areas of reduced wall thickness then may be adjusted to cause the flange 24 to protrude into the mold cavity by an amount corresponding to the difference between the proper wall thickness and the undesirable, thinner wall portion of the model molding.

When the bars around the periphery of the mold have been adjusted, the flanges 24 may assume a somewhat sinusoidal configuration. That is, certain portions of the flanges may remain flush with the inner surface of the associated mold wall, whereas other portions may protrude into the cavity. The extent to which any portion of the flange 24 may protrude into the cavity will depend, in part, upon the width of the slots 26. Satisfactory results have been achieved utilizing slots about three-thirtyseconds inch in width.

Figure 7:
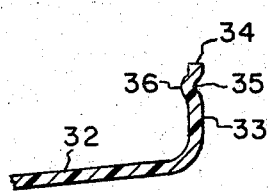
FIG. 7 is an enlarged, sectional view of a portion of a part molded in accordance with the invention.
Figure 6:
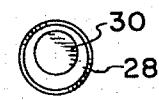
FIG. 6 is an end elevational view of an adjusting cam as it appears when viewed in the direction of the arrows 6—6 of FIG. 4.

Following adjustment of the bar 22, another product may be molded. A portion of such molded product is shown in FIG. 7 and comprises a wall 32 corresponding to the cavity base 11 and having a marginal flange 33 trimmed to form a marginal edge 34. The flange 33 of the molded part has an outer surface which is flat except for an indentation 35 formed by the portion of the flange 24 which protrudes into the cavity. The inner surface of the flange is displaced inwardly to form a protuberance 36. The thickness of the peripheral wall from the smooth surface 33 to the protuberance 36 should correspond to the desired wall thickness of the flange of the molded part.

A molded product formed in accordance with the invention then may have its marginal edge fitted into the retaining strips 8 whereupon an effective seal is obtained around the periphery of the molded part.

The disclosed embodiment is representative of a presently preferred form of the invention but is intended to be illustrative rather than definitive thereof. The invention is defined in the claims.

I claim:

1. A mold construction comprising a mold member having a cavity therein defined by a wall, said wall having an elongate groove therein opening into said cavity; flexible means having a length corresponding substantially to that of said groove and accommodated in said groove for movement inwardly and outwardly of said cavity; and a plurality of independently operable adjusting means engageable with said flexible means at longitudinally spaced apart intervals for adjusting selected portions of said flexible means inwardly and outwardly of said cavity.

2. The construction according to claim 1 wherein said flexible means comprises a bar having an uninterrupted edge confronting said cavity and being slotted at intervals along its opposite edge.

3. The construction according to claim 2 wherein said adjusting means engages said bar between adjacent slots.

4. The construction according to claim 3 wherein said bar has an opening therein between adjacent slots for the accommodation of the associated adjusting means.

5. The construction according to claim 4 wherein each of said adjusting means is rotatable and has an eccentric portion extending into its associated opening.

6. The construction according to claim 1 wherein said flexible means comprises an elongate bar having a body joined at one end to a flange having a thickness less than that of said body, said flange occupying said groove.

7. The construction according to claim 6 wherein said body is slotted at intervals along its length from its other edge toward said flange.

8. The construction according to claim 7 wherein said slots are of uniform depth and width.

9. The construction according to claim 7 wherein said slots extend at least to the juncture of said flange and said body.

10. The construction according to claim 7 wherein said slots extend beyond the juncture of said flange and said body.

11. The construction according to claim 6 wherein that edge of said flange confronting said cavity is smooth.

12. The construction according to claim 1 wherein each of said adjusting means comprises rotatable cam means.

13. The construction according to claim 12 wherein said flexible means has openings therein in which said cam means are accommodated.

* * * * *